(Model.)

10 Sheets—Sheet 1.

M. E. BLOOD.
CORD TYING DEVICE FOR GRAIN BINDERS.

No. 278,083. Patented May 22, 1883.

Witnesses:
Sylvanus Holcomb
Samuel W. Winders

Inventor:
Maurice E. Blood

N. PETERS, Photo-Lithographer, Washington, D. C.

(Model.)
M. E. BLOOD.
CORD TYING DEVICE FOR GRAIN BINDERS.
No. 278,083. Patented May 22, 1883.
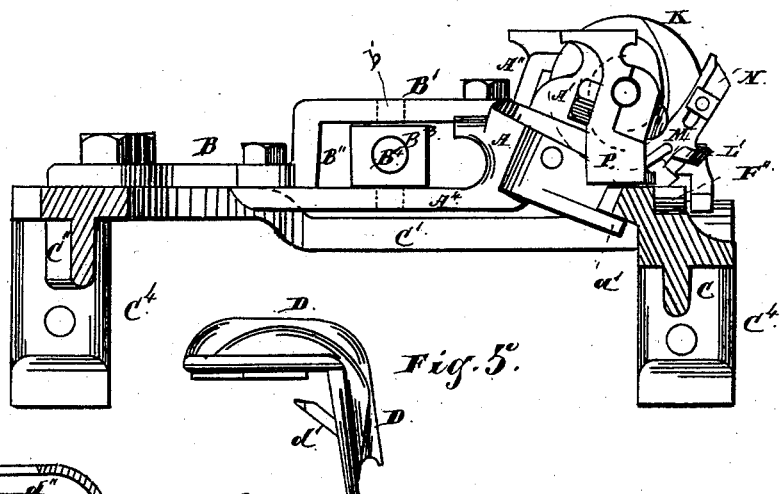
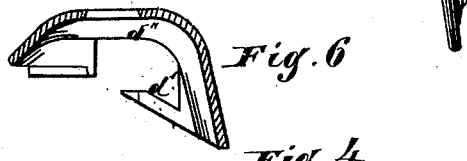
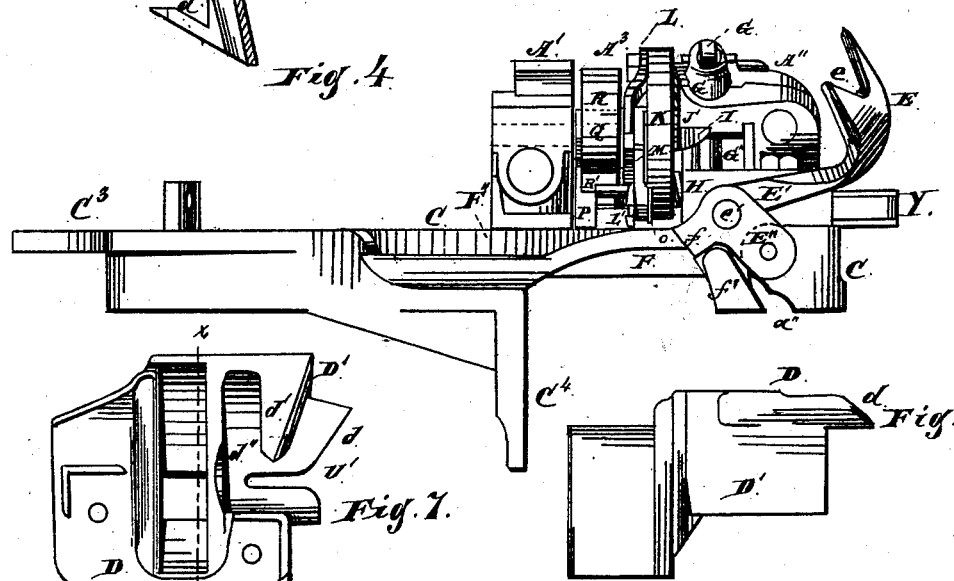
Witnesses:
Sylvanus Holcomb
Samuel W. Winders
Inventor:
Maurice E. Blood (Model.)

M. E. BLOOD.
CORD TYING DEVICE FOR GRAIN BINDERS.

No. 278,083. Patented May 22, 1883.

Witnesses:
Sylvanus Holcomb
Samuel W. Winders

Inventor:
Maurice E. Blood

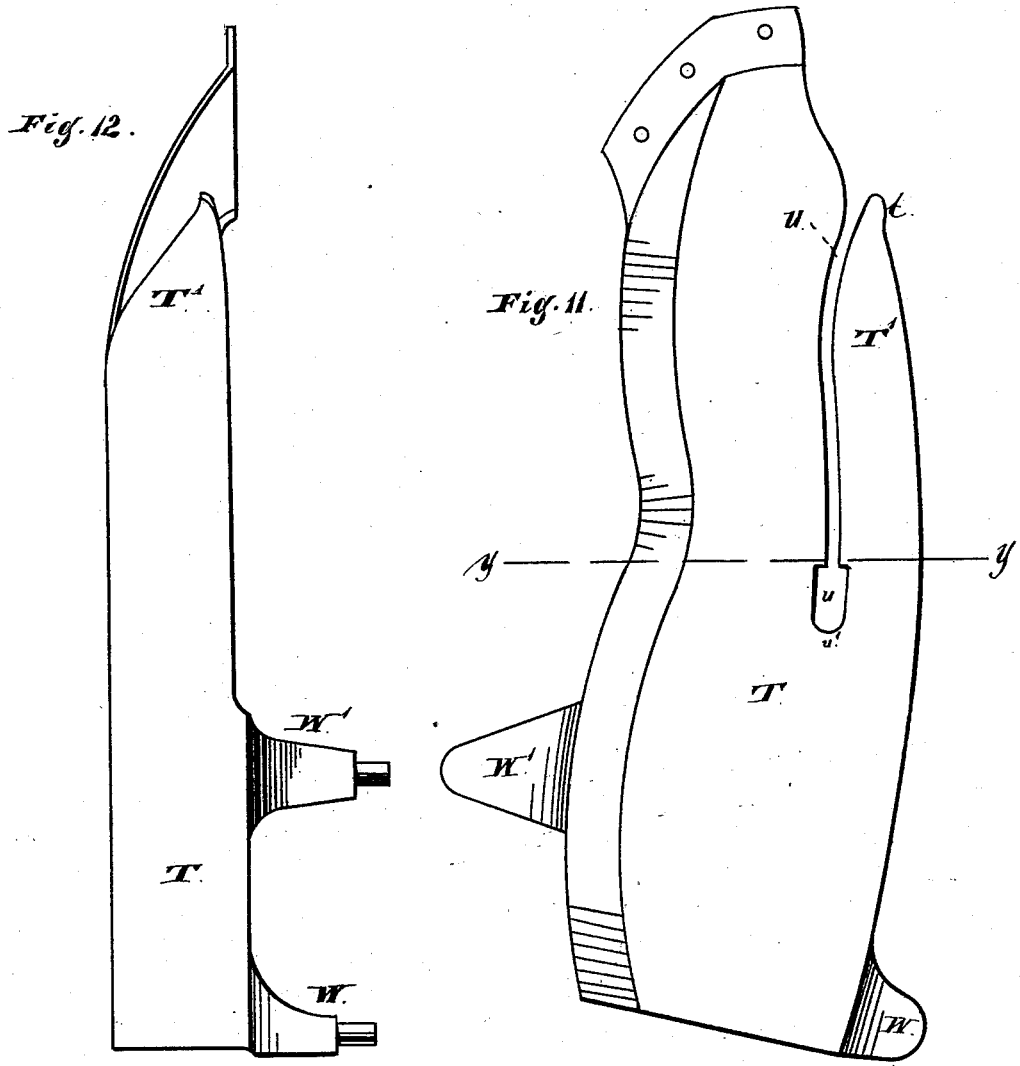

(Model.)

10 Sheets—Sheet 5.

M. E. BLOOD.
CORD TYING DEVICE FOR GRAIN BINDERS.

No. 278,083. Patented May 22, 1883.

Witnesses:
Sylvanus Holcomb
Samuel W. Winders

Inventor:
Maurice E. Blood (Model.) 10 Sheets—Sheet 6.
M. E. BLOOD.
CORD TYING DEVICE FOR GRAIN BINDERS.
No. 278,083. Patented May 22, 1883.
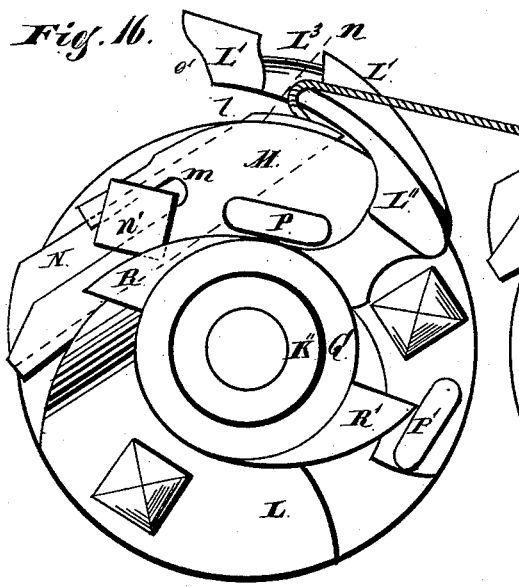
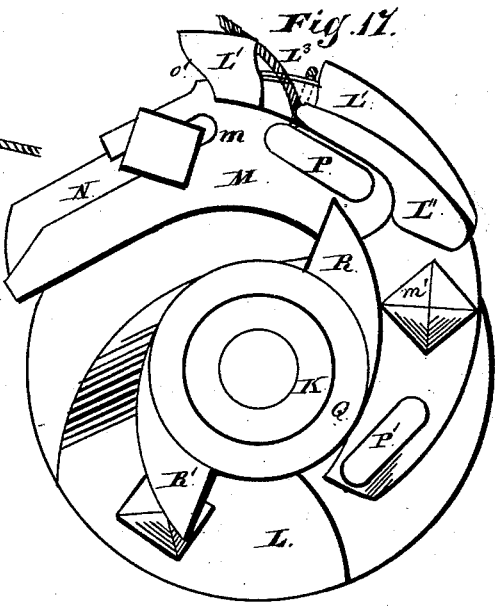
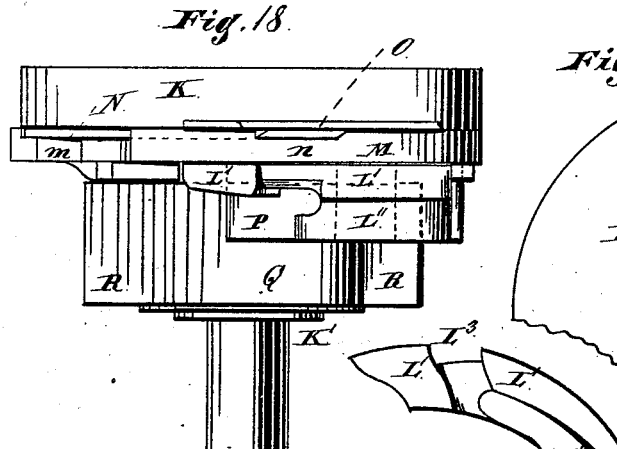
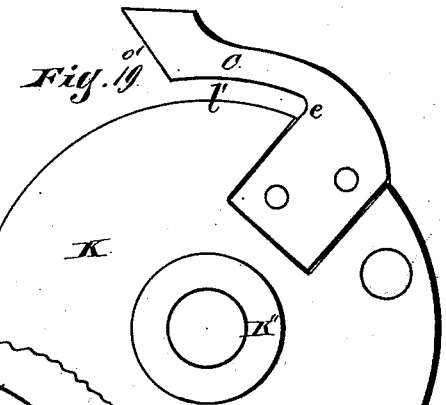
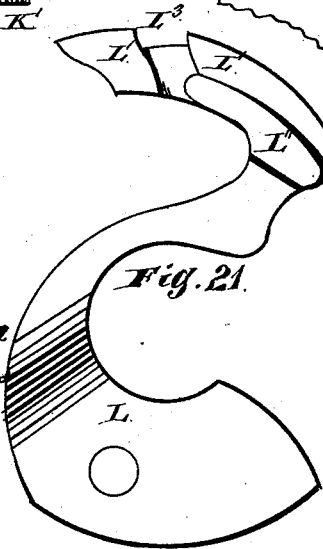
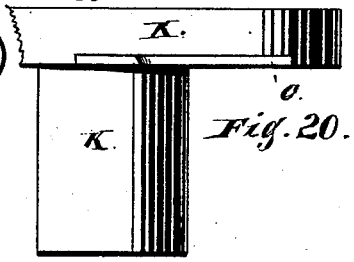
Witnesses:
Inventor:
Maurice E. Blood (Model.)

M. E. BLOOD.
CORD TYING DEVICE FOR GRAIN BINDERS.

No. 278,083. Patented May 22, 1883.

Witnesses:
Sylvanus Holcomb
Samuel W. Winders

Inventor:
Maurice E. Blood (Model.) 10 Sheets—Sheet 8.
M. E. BLOOD.
CORD TYING DEVICE FOR GRAIN BINDERS.
No. 278,083. Patented May 22, 1883.
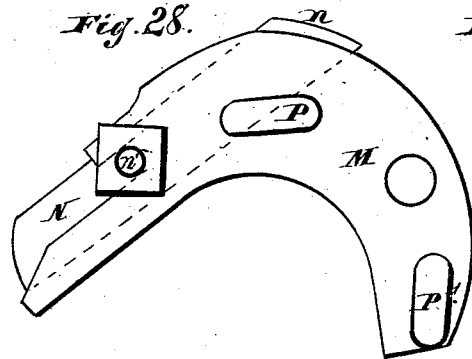
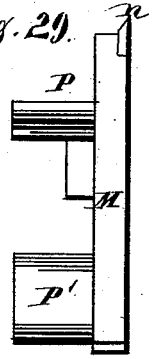
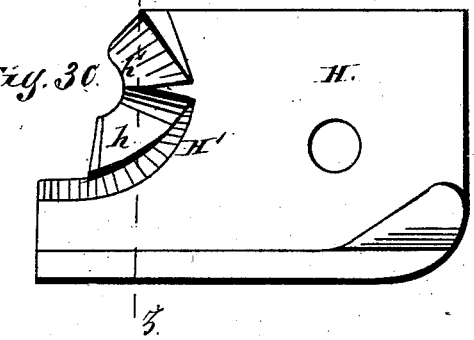
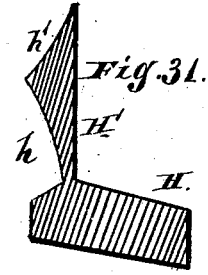
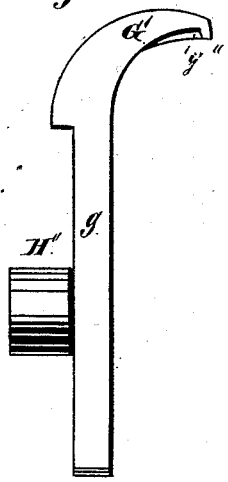
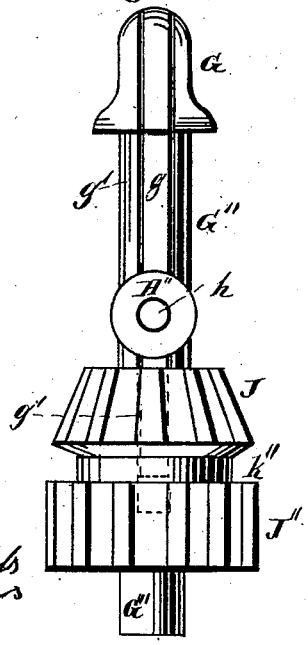
Witnesses:
Sylvanus Holcomb
Samuel W. Winders
Inventor:
Maurice E. Blood (Model.)

M. E. BLOOD.
CORD TYING DEVICE FOR GRAIN BINDERS.

No. 278,083. Patented May 22, 1883.

10 Sheets—Sheet 9.

Witnesses:
Sylvanus Holcomb
Samuel W. Winders

Inventor:
Maurice E. Blood

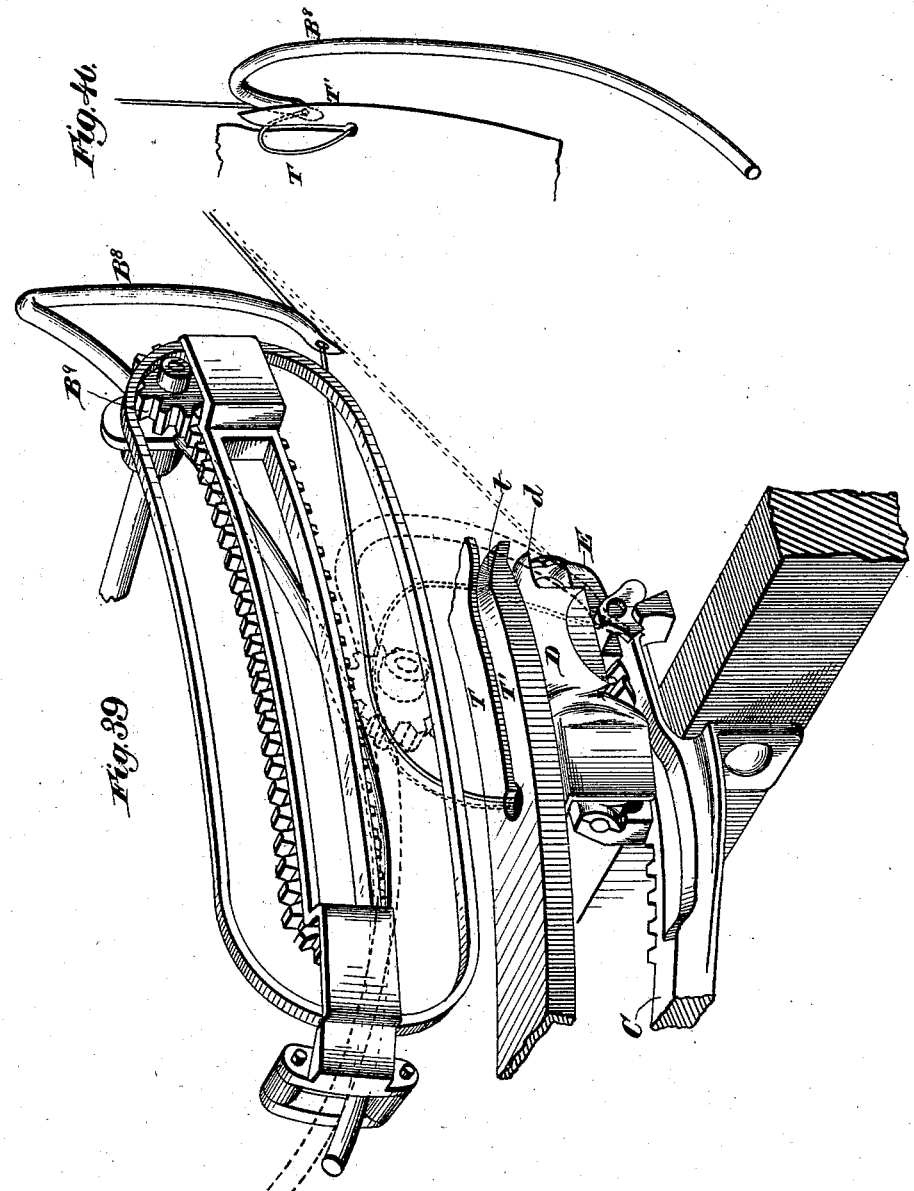

UNITED STATES PATENT OFFICE.

MAURICE E. BLOOD, OF SYCAMORE, ILL., ASSIGNOR TO HIMSELF, CHARLES W. MARSH, AND WILLIAM W. MARSH, ALL OF SAME PLACE.

CORD-TYING DEVICE FOR GRAIN-BINDERS.

SPECIFICATION forming part of Letters Patent No. 278,083, dated May 22, 1883.

Application filed September 5, 1881. (Model.)

*To all whom it may concern:*

Be it known that I, MAURICE E. BLOOD, residing at Sycamore, in the county of De Kalb and State of Illinois, and a citizen of the United States, have invented a new and useful Improvement in Cord-Tying Devices for Grain-Binders, of which the following is a full description, reference being had to the accompanying drawings, in which—

Figure 1:
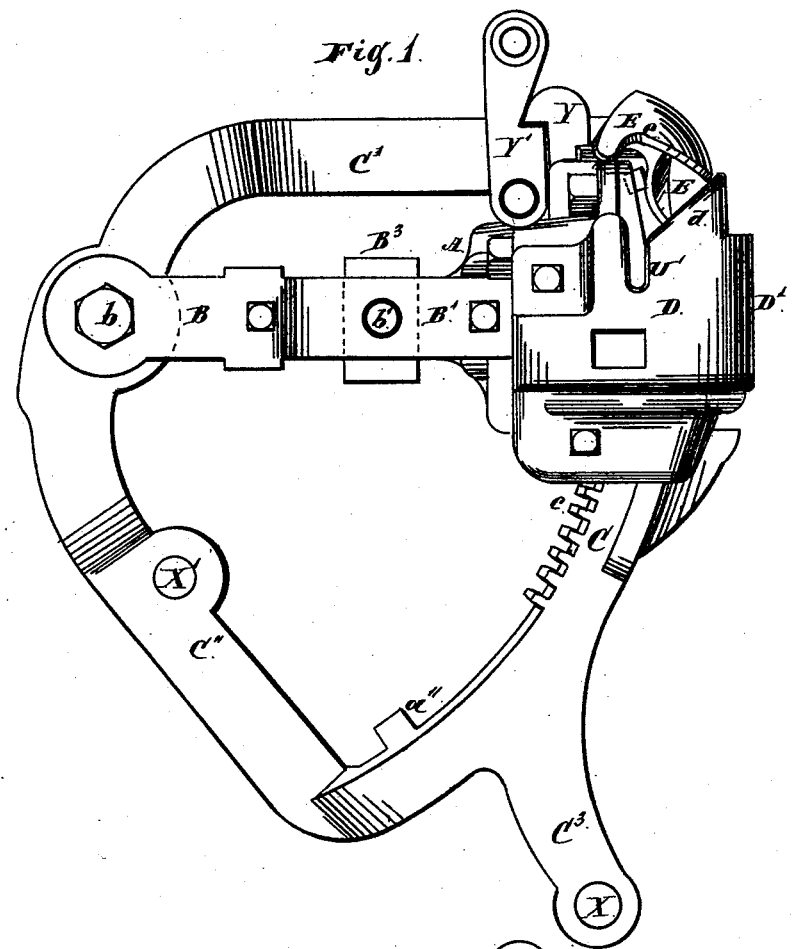
Figure 2:
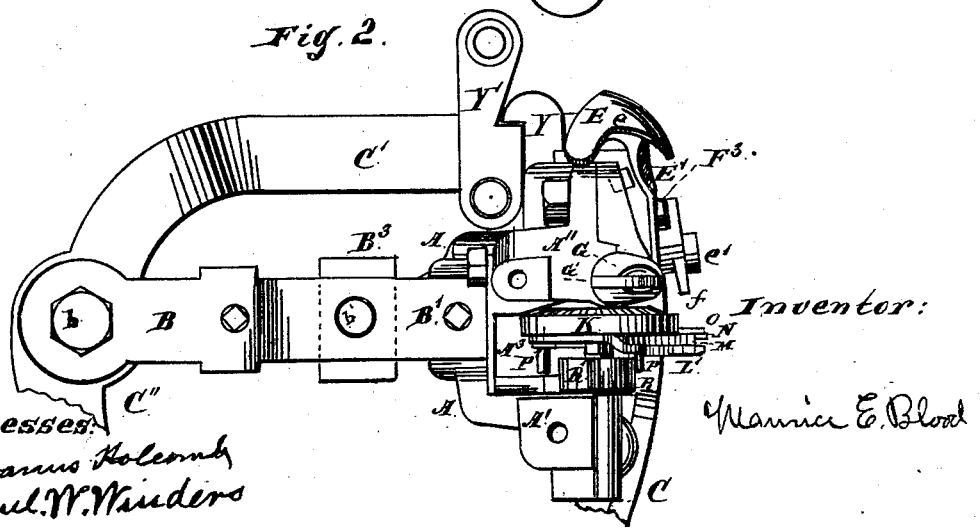
Figure 9:
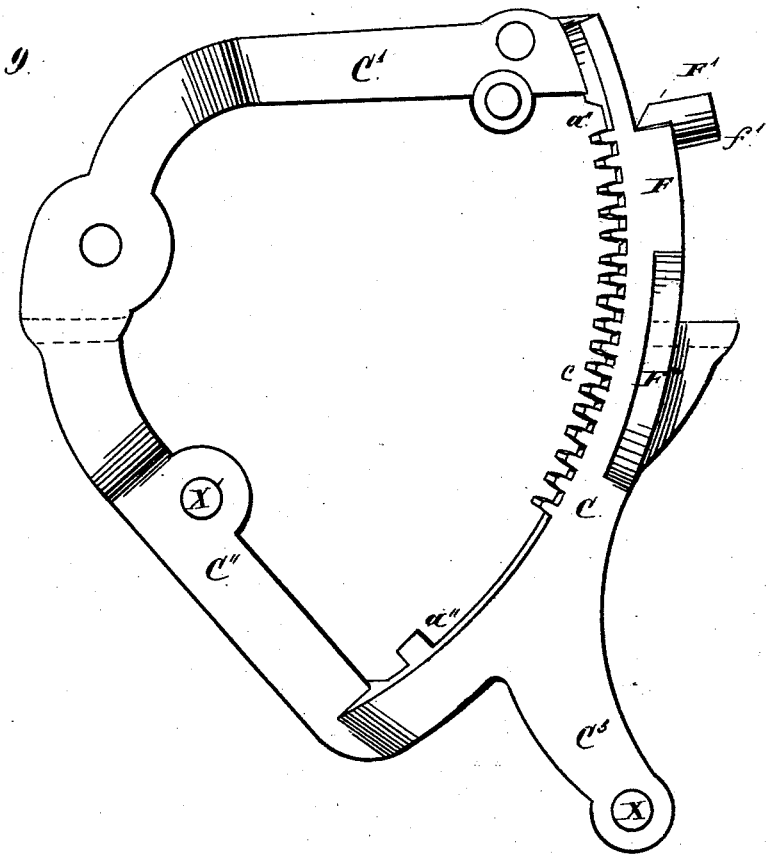
Figure 10:
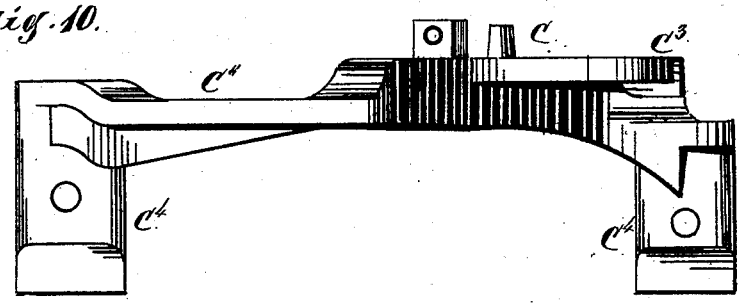
Figure 14:
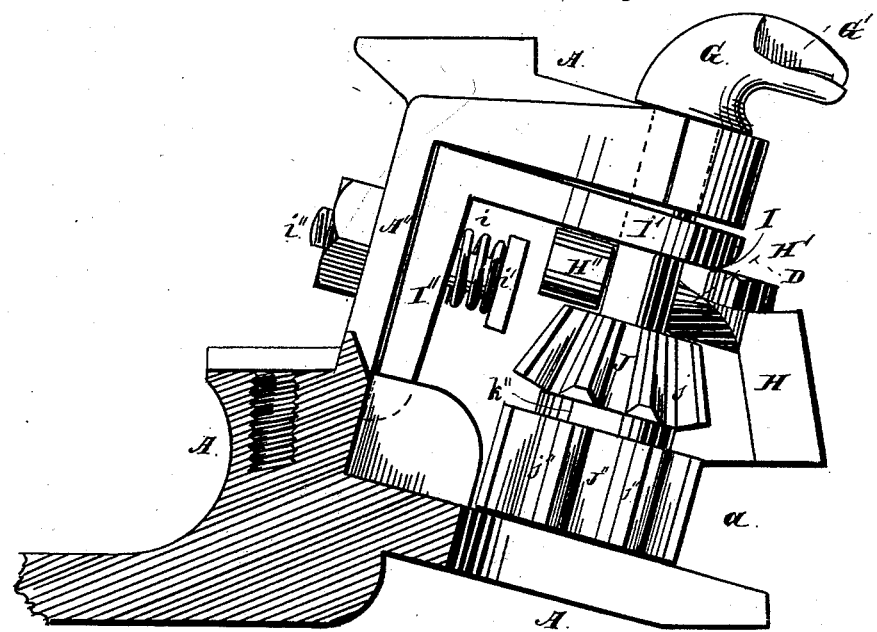
Figure 15:
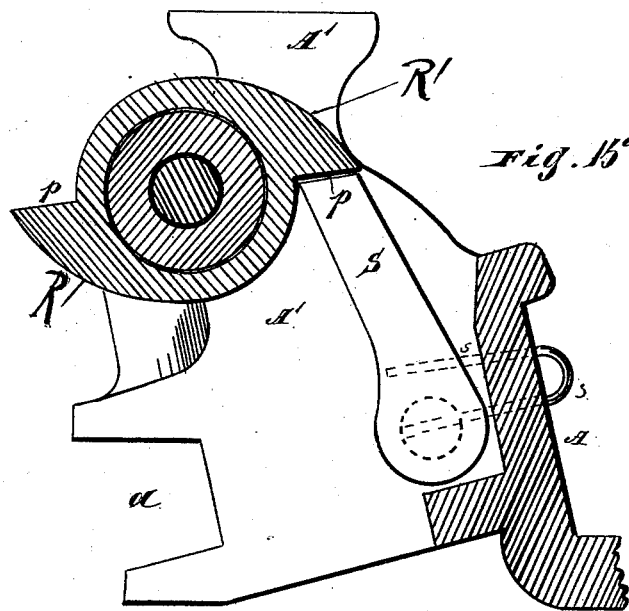
Figure 22:
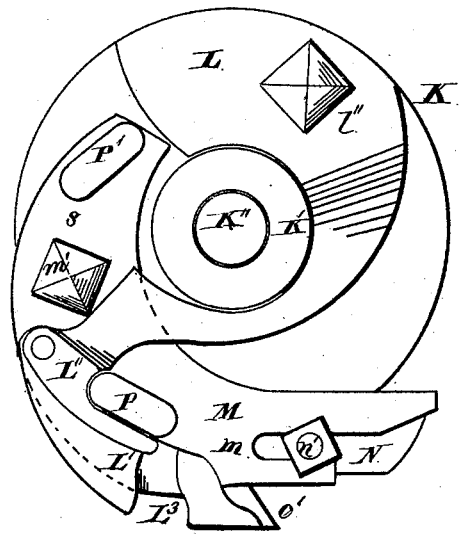
Figure 23:
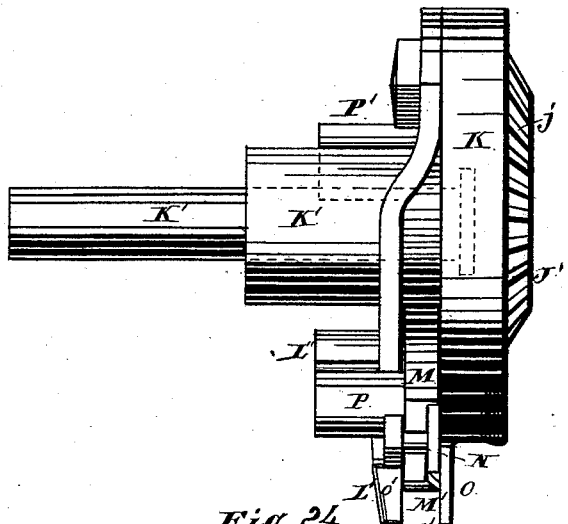
Figure 26:
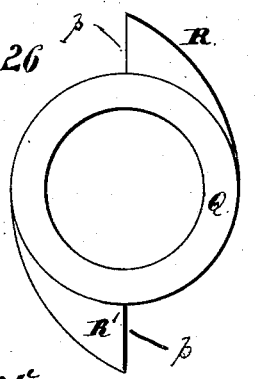
Figure 27:
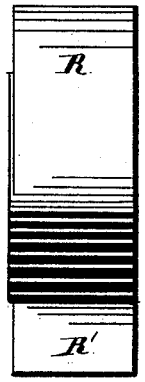
Figure 24:
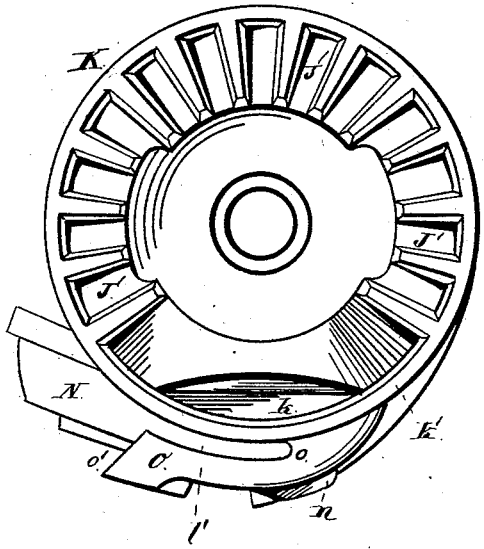
Figure 25:
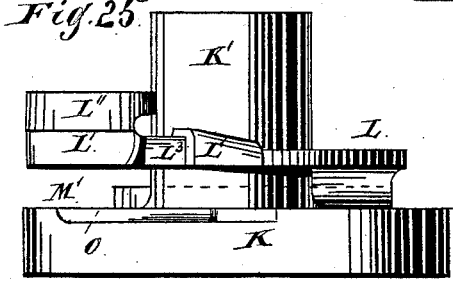
Figure 34:
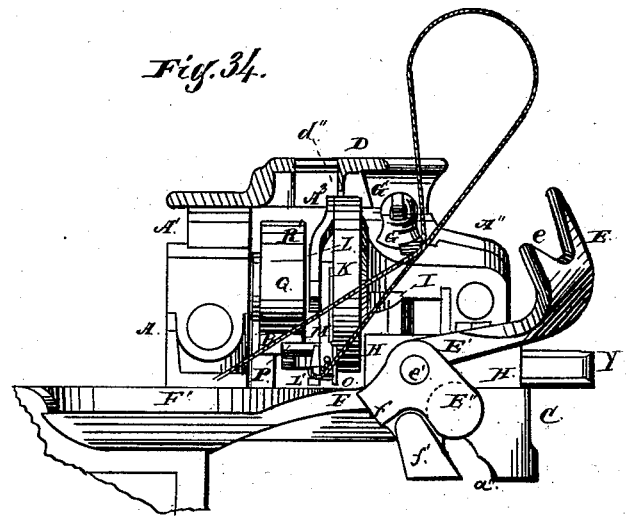
Figures 35, 37:
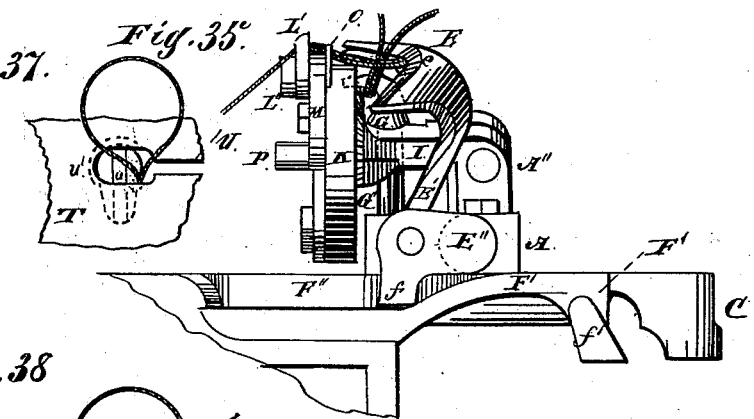
Figure 38:
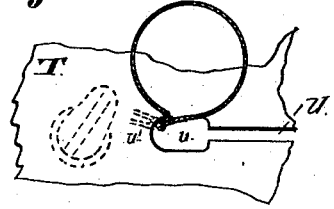
Figure 36:
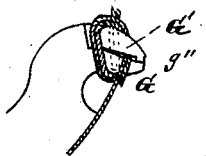

Figure 1 is a top view, showing the head carrying the knot-tying devices, the mechanism for operating the knot-tying devices, and the lock or catch for locking the tyer at the completion of its forward movement, in their several relations to each other when the tyer is at rest in its forward position; Fig. 2, a top view of the parts shown in Fig. 1, and in the position there shown, the cover or cap for tying devices being removed and the operating-rack partly broken away; Fig. 3, a side elevation, with the rack in section and the cover or cap of the tying devices removed, showing the parts in the same position as in Fig. 1; Fig. 4, a front elevation of the parts shown in Fig. 1, and in the position there shown, with the cover or cap of the tying devices removed; Fig. 5, a detail, being an end view of the cover or cap for the tying devices, shown in the position it occupies when in place over the tying devices; Fig. 6, a cross-section of the cover or cap for the tying devices on line *x x* of Fig. 7; Fig. 7, an inside view of the cover or cap for the tying devices; Fig. 8, a front elevation of the cover or cap for the tying devices; Fig. 9, a top view of the operating-rack; Fig. 10, a side elevation of the rack; Figs. 11 and 12, a top view and a side elevation, respectively, of the guard or covering-plate, having a slot or guideway for the binding-cord, and located over the tying devices; Fig. 13, a cross-section on line *y y* of Fig. 11; Fig. 14, an enlarged detail showing the head or support for the tying devices partly in section, the knot-tying hook, the cams and roller for opening and closing the jaw of the hook, the gear-pinion for revolving the hook, and the beveled-gear pinion for operating the cord-holding devices; Fig. 15, an enlarged detail showing the head or support for the tying devices partly in section, and showing also the cam for opening and closing the cord cutting and holding devices, the hub of the beveled-gear pinion of the cord-holding devices, the shaft therefor, and the lock or stop for the cam; Fig. 16, an enlarged detail, being a rear face view of the wheel or disk carrying the cord cutting and holding devices, with said devices thereon and in the position they occupy when the cord-holder is open; Fig. 17, a similar view, with the parts in the position they occupy when the cord-holder is closed; Fig. 18, an enlarged detail, being an elevation of the wheel or disk and the parts shown in Fig. 16, and in the position there shown; Fig. 19, an enlarged detail of the wheel or disk carrying the cord cutting and holding devices, and showing the stationary knife or blade of the cord-cutter; Fig. 20, an enlarged detail, being an edge elevation of the parts shown in Fig. 19; Fig. 21, an enlarged detail, being a side view, showing the form of the stationary jaw or plate of the cord-holder; Figs. 22, 23, and 24, enlarged details, being a rear face view, a side or edge elevation, and a front face view, respectively, of the wheel or disk carrying the cord cutting and holding devices, with said devices thereon, the devices being in the position they occupy while holding the cord; Fig. 25, an enlarged detail, being a side elevation of the wheel or disk carrying the cord holding and cutting devices, with the cutting-plate removed; Figs. 26 and 27, enlarged details, being a side or edge view and face view, respectively, of the cam for opening and closing the cord holding and cutting devices; Figs. 28 and 29, enlarged details, being a side and an edge view, respectively, of the movable jaw or plate of the cord-holder, and showing also the location of the movable knife thereon; Fig. 30, a top view of the plate, with the lower cam thereon, which opens the movable jaw of the hook; Fig. 31, a cross-section on line *z z* of Fig. 30; Fig. 32, an enlarged detail, being a side elevation of the movable jaw of the hook; Fig. 33, an enlarged detail, being a rear elevation of the hook; Fig. 34, a detail, being a front elevation of the tying devices, with the cover or cap in section, showing the parts in the position they occupy at the commencement of the tying; Fig. 35, a detail, being a front elevation of the tying devices, with the cover removed, showing the parts in the position they occupy at the completion of the knot-loop, and just before the jaw closes and grasps the cord; Fig. 36, a detail showing the end of the hook with the knot formed and in position to be stripped and complete the tying; Fig. 37, a detail showing a section of the upper guard-plate or cover, with the hook in dotted lines, and in the position it occupies at the commencement of the stripping; Fig. 38, a similar view, showing the hook in dotted lines, and in the position it occupies when the stripping is completed; Fig. 39, a broken perspective view, showing a portion of the cover to the knot-tying devices, and a binder-arm operating in a peculiar manner, to illustrate the manner of carrying the cord to the cord-holder; and Fig. 40 is a broken plan view of the cover to the knot-tying devices and the binder-arm to illustrate the manner in which the latter causes the cord to enter the slot in the cover.

This invention relates to the tying devices of that class of automatic grain-binders which use cord as the material for doing the binding, and has for its objects to simplify, improve, and perfect the parts which compose the tyer, to insure a positive and reliable knot which will not slip or become loose in the subsequent handling of the bundle, and have the operation of tying of such nature as to relieve that portion of the string which encompasses the bundle from undue strain for the tying operation, and to improve generally the construction and operation of the tying devices as a whole, and have the parts composing the devices occupy but little space, and have the same movement of the binder-head perform all the operations—that of forming the knot-loop, severing the cord, drawing the strand through the loop to complete the knot, and stripping the loop to complete the tying. These objects I accomplish by the mechanism illustrated in the accompanying drawings and hereinafter described and claimed.

The head or support A may be made of cast-iron or other suitable material, which can be cast or otherwise formed into shape to have a base or bottom portion, with side pieces forming standards or supports $A'$ $A''$, between which is an opening, $A^3$, for the reception of the knot-tying devices and the mechanism for operating the same, and may be of the form shown, or of any other form suitable for the purpose of receiving and supporting the tying mechanism. This head or support A has a rearward extension, $A^4$, which is secured in any suitable manner to an arm, B $B'$, the portion $B'$ being elevated somewhat in the form shown, so as to leave an opening, $B''$, between it and the extension $A^4$, in which is pivoted a block or head, $B^3$, having an opening, $B^4$, for the reception of a pitman, or other means for connecting it with the binding-arm or some other portion of the machine for the purpose of giving the head a reciprocating movement. The portion B of this arm is pivoted by a suitable bolt, $b$, to the frame of the rack, and is made separate from the extension $A^4$ for the purpose of facilitating the insertion of the block $B^3$, the trunnions $b'$ of which have their bearings in the extension $A^4$ and the part $B'$; but this arm might be cast or formed with the head A and form a part thereof, instead of being an independent piece, if so desired.

The rack may be of any desired form. As shown, it consists of a front bar, C, on which are the cogs $c$ and side bars, $C'$ $C''$, Figs. 1, 9, and 10. It is secured to the frame-work of the harvester by the lugs $C^4$, by means of bolts, or in any other suitable manner, and is so arranged as to bring the tying devices in proper relation to the binding-arm. The front bar, C, has an extension, $C^3$, which forms one point of support for the outer guard-plate or covering.

Over the tying devices, and secured in any suitable manner to the standards $A'$ $A''$ of the head or support, is located a cover or cap, D $D'$, formed as shown in the detail, Figs. 5, 6, 7, and 8. The top D of this cover has a slot, $U'$, in line, or nearly so, with the center of the knotting-bill, the slot being of sufficient depth to allow the cord to pass in the required distance to be caught by the bill. The forward end of this portion D of the cover has an extension or nose, $d$, with an inclined face leading to the slot $U'$, which forms a guide to insure the passage of the cord therein, and also forms a means of keeping the part of the cord above the bill in proper position to be caught and wound thereon to form the loop. On the part $D'$, near the forward end, at the lower edge, on the inside, is an upwardly and inwardly projecting spur, $d'$, which stands in such relation to the knotting-bill as to form a guide for that part of the string below the bill to bring it in position to be wound thereon to form the loop. By means of these two guides $d$ $d'$ the cord in all cases will be directed to the precise point for the action of the bill to form the loop, thereby insuring the formation of such loop in each instance. This cover or cap D $D'$ has a groove or recess on its inner face, which forms a passage for the cutting and holding devices, and on one side of this groove, and over the wheel which carries the cord holder and cutter, is a flange, $d''$, which acts to keep the cord on the periphery of the wheel or disk, and in position for the strands to be caught between the jaws of the hook to be drawn through the knot-loop, thereby insuring a proper operation in this respect.

The cord-tucking device is formed with a head or hook portion, E, a body or arm, $E'$, and a side extension, $E''$, as shown in Fig. 4. This tucking-arm is pivoted near its lower end to a stud, $e'$, on the block H, so that the arc of a circle which its upper end describes will bring the cord in line with the knotting-bill, the head E acting in conjunction with the guide $d$ for this purpose, and having a notch, $e$, to receive the cord and retain it while the arm is advancing. The head or hook E is broad and thin, and the opening $e$ has a wide mouth to insure the catching of the cord and guiding it to its center, where it is held while being carried forward. This hook or head E and the spur $d'$ are so arranged in relation to each other that the head or hook will pass over the spur and above the tying-bill, and between it and the extension or nose $d$.

On the side arm or extension, $E''$, is journaled the roller $F^3$, which is so arranged as to be in line with an end face, $F'$, over which it rides onto the track or way F, at the end of which is a depression, $F''$, into which the roller can drop. These parts F $F'$ $F''$ are formed on the front bar, C, of the rack-frame, and furnish the means, in connection with the roller $F^3$, for automatically operating the cord-tucking hook, the roller striking and riding over the end face, $F'$, throwing the hook forward, where it is held, by the engagement of the roller with the track F, until the bill grasps the string, after which the roller enters the concavity $F'''$, allowing the hook to drop back out of the way while the loop is being drawn from the bill.

On the lower end of the arm $E'$ is a projection or catch, $f$, so arranged as to come in contact with a stop, $f'$, located near the end of the portion C of the rack-frame, at the proper point to throw the hook down or open as the head or support A nears the terminus of its forward movement, and hold the hook in this open position while the head remains stationary at the completion of its movement and is in the position shown in Fig. 1.

The acting portion of the tying-bill is formed from two heads, G $G'$, one of which, G, constitutes the stationary jaw, and the other, $G'$, the movable jaw. The movable jaw $G'$ is located on a shank or stem, $g$, and the head G, with its stem $G''$, is provided with a groove, $g'$, in which is located the jaw G and its stem or shank $g$, and the form and arrangement of these parts are shown more fully in the detail, Figs. 14, 32, and 33.

On the lower end of the shank or stem $G''$ is secured a pinion, $J''$, the cogs $j''$ of which mesh with the cogs $c$ of the rack to give the bill a rotary movement, and above this pinion $J''$, on the stem or shank $G''$, is a beveled-gear pinion, J, which rotates the wheel or disk which carries the cutting and holding devices. The stem or shank $G''$ projects below the pinion $J''$ and has its bearing at this end in the base of the head A, a suitable bearing being provided at the other end, just below the head or bill G, one half of which is in the standard $A''$ and the other in a cap-piece secured to the standard in the usual manner, and the stem $g$, with its hook or head $G'$, is held in position in the groove $g'$ by the pinion J and the upper bearing for the stem $G''$, both of which encompass the stem $g$ and prevent the jaw $G'$ $g$ from becoming displaced or slipping out of their groove, the stem $g$ projecting at its lower end some distance below the pinion J for this purpose.

On the stem $g$, on a journal, $h$, is a roller, $H''$, by means of which and cams $H'$ and I the jaw or bill $G'$ is opened and closed. The cam $H'$ is formed as shown in Figs. 30 and 31, and is located on the block H, secured to the head or support A, by means of a bolt, or otherwise, so as to bring the cam in the arc of the circle described by the roller in the revolution of the bill, and cause the roller as it rides up the incline of the cam to raise the stem $g$, and with it the head or bill $G'$, and open the jaws. This cam has two inclines, one of which, $h'$, acts to open the jaws for the reception of the cord as the knot is being formed, and the other acts on the reverse movement to raise the jaw for its passage over the rim of the disk or wheel K.

The cam I is located on the outer end of a support, $I'$, and is so arranged in relation to the cam $H'$ and the roller $H''$ as to act on the roller and draw the stem $g$, with its head or jaw $G'$, down as the roller passes the apex or end of the incline $h'$, thereby closing the jaws and holding them firmly with the string caught between them. This operation of closing the jaw is performed with each forward and back rotation of the bill, and the cam is so formed and arranged as to close the jaw as the main cord is severed and the end released from the holder, and to hold it firmly until the loop is drawn or stripped from the bill and the knot drawn tight, at which time the roller $H''$ passes from the cam I and the cord is released without requiring any pulling or drawing of the string in being released. The support which carries the cam is formed of two arms standing at right angles to each other, one of which, $I'$, has the cam formed thereon, and the other is attached to the standard or support $A''$ by means of a suitable bolt, around the stem $i''$ of which, and between the head $i'$ thereof and the face of the arm $I''$, is a spring, $i$, which acts to allow the cam I to engage the roller H and close the jaw $G'$, irrespective of the size of the string which may be used in binding. The form and location of this support for the cam I is shown in Fig. 14, and it will be seen that the angle at which the arms of the support stand do not coincide with the angles of the opening in the standard $A''$ in which it is located, by which arrangement the fulcrum or bearing comes at the juncture of the two arms at the corner, so that the jaw is free to move to the extent of the space between the arms and its support and the face of the standard $A''$ and adjust itself to conform to the size of string used.

The wheel or disk K is provided on its front face with a series of cogs, $j'$, extending nearly around, which form a beveled gear, $J'$, which meshes with the pinion J, and the space between the terminus of the cogs is cut away, so as to leave an opening or passage, $k$, for the end of the bill in describing its rotation. This wheel or disk is provided with an elongated hub, $K'$, by means of which it is mounted on the shaft $K''$, so as to run uniformly and evenly, which shaft is supported rigidly in the standard $A'$. On the rear face of this wheel K, and around its hub $K'$, are located the cord holding and cutting devices, and on the hub $K'$ is loosely mounted the cam which operates such devices.

The cord-holder consists of two plates, L M, one of which, L, is stationary, and the other, M, is movable. The plate L is attached to the disk or wheel by means of a bolt or screw, $l''$, or otherwise, and its acting portion is provided with a head, L', on which is a stop or rest, L'', over which the string passes to the binding-arm while the disk is completing its backward movement and a portion of its forward movement. In this head L' is formed the notch $L^3$, which receives the cord and holds it while being passed around the bundle and until the knotting-bill takes it to draw the ends through the loop to complete the knot. Between the under face of this head L' and the periphery of the wheel or disk is an opening, $l$, into which the cord passes to be caught and held, which opening is shown in Fig. 16, and the form of the plate L and its head L' L'' is shown in Figs. 16, 17, 18, 21, 22, and 23. This plate is curved so that the main portion stands parallel with and away from the face of the disk or wheel, so as to leave an opening, M', in which is located the movable plate or arm M of the holding device. This plate is pivoted to the face of the disk or wheel by means of a bolt, screw, or other pivot, $m'$, (see Fig. 22,) and has a rocking movement on such pivot, so that its acting end will be raised to catch and hold the cord or depressed to release it. In the acting end of this plate M is a slot, $m$, which receives a bolt, $n'$, or other device, by means of which the knife N is attached to M, so as to move therewith. This knife N is formed from a single plate, having at one end a cutting-edge, $n$, which projects slightly beyond the edge or periphery of the arm M, as shown in Figs. 28 and 29. The other cutting blade or knife is formed from a plate, O, secured at one end, in any suitable manner, to the face of the disk or wheel K, and so arranged that its outer face and the face of the wheel or disk will be flush. Between the body of this knife and the periphery of the wheel K is an opening, $l'$, which coincides with the opening $l$ below the head L', and at the end of this opening $l'$ is formed the cutting-edge $o$, which coacts with the cutting-edge $n$ to sever the cord. The outer end of this plate O and the outer end of the head L' have inclined faces, which form a hook or catch, $o'$, by means of which the main cord is taken from the binder-arm as the backward movement of the tying devices commences, and keeps it in that position until the movable plate or part M of the holder is depressed, when the main cord passes into the opening $l\ l'$ in a position to be caught, held, and cut. Projecting laterally from the face of plate M are lugs P P', one located each side of the pivot $m'$, as shown in Fig. 28. Against the face of each of these lugs the cams R R' are made to bear alternately by the rotation of the disk or wheel K, the engagement of one of the cams with the lug P raising the plate or holder M, and the engagement of the other cam with the lug P' depressing said plate or holder M, for the purpose of opening and closing the holder, as before described. The cams R R' are formed on a collar or bearing, Q, having a central opening to receive the hub K' and mount the cams thereon so as to revolve freely, and the cams are located on the bearing Q, so as to be directly opposite each other, and they have the same contour, so that either cam will operate the holder in precisely the same manner, requiring no special adjustment or arrangement in order to make them operative. One face of each cam is abrupt or straight, and against this face the lug P' will engage in the forward movement of the knotter to carry the cams around with the wheel or disk a half-revolution, and on the reverse movement the cams are locked or held rigid, so as to perform their work, by a latch or stop, S, pivoted at its lower end, in any suitable manner, to the face of the standard A, its free end engaging with the abrupt or straight face $p$ (see Fig. 15) of each cam alternately, to hold the cam rigid, this free end moving out as the cam revolves to allow the cam to pass on its forward movement, and being returned to engage and stop the cam when the movement is reversed by a spring, $s$. The form of the cam and the relation of the stop or catch thereto is shown in Fig. 15, and any other form of the spring $s$ than that shown in said figure may be used to throw the free end of the catch or stop into engagement and allow it to move out of the way for the passage of the cam.

Above the entire knotting device is located a guard-plate or covering, T T', formed as shown in Figs. 11 and 12, a suitable slot, U, being provided for the passage of the binding-cord, which opening is above and in line with the opening U' in the plate or cover D D'. The portion T' of this guard-plate or covering has its front end, $t$, pointed, to act as a catch to pass between the binding-arm and the string and guide the string into the slot U, and the front edge or face of this plate is formed on the arc of a circle which corresponds to the circle described by a binding-arm, which has a horizontal movement or swing in passing the binding-cord around the bundle. At the base or end of the slot U is an enlarged opening, $u$, for the passage of the knot, the end $u'$ of which opening acts as a stripping device, taking the knot from the bill at the completion of the tying. This guard-plate or cover is attached to the rack-frame by means of legs W W', the ends of which enter openings X X' in such frame, the opening X being located in the extension $C^3$ of the frame. This plate or covering will also be secured by bolts, screws, or otherwise, to some portion of the frame-work of the harvester, and its purpose is to prevent dirt, dust, straw, and other obstructions from entering the tying devices and interfering with the operation thereof, as well as serving as a stripping device for the knot and a guide for the binding-cord.

The face of the wheel or disk K which is provided with the beveled gear J' has a rim or flange, $k'$, extending around its entire circumference, just outside of the cogs $j$, the edge of which rim or flange is flush with the face of the cogs, so that the rim or flange will form a guard to prevent the string from becoming entangled in the cogs and interfering with the operation of the device, and a groove, $k''$, is formed between the pinions J J'' for the passage of the rim or flange $k'$.

The front of the head A' A'' is provided with a recess or slot, $a$, for the entrance of the bar C of the rack-frame, so that the rack $c$ can engage the pinion J'', and at the same time have the rack-frame form a support for the head as it is reciprocated thereon.

The operation is as follows: The cord, when it is in a position to receive the bundle, passes from the spool through a suitable eye near the end of the binding-arm, Figs. 39 and 40, to the cord-holder, where its end is caught and firmly held, as hereinafter explained. The end of the cord, being retained in the cord-holder, passes up through the slot U in the guard-plate T T'. In order to clearly illustrate one mode of carrying the cord around the gavel and causing it to engage with the cord-holder, I have shown in Fig. 39 a binder-arm, $B^8$, which has movements imparted to it the same as set forth in my application for Letters Patent filed September 5, 1881, Serial No. 41,335. It is not deemed essential to describe the peculiar movements of the binder-arm, further than to say that it has a forward, downward, rearward, and upward movement imparted to it, according to the position of the pinion $B^9$. The end of the binder-arm is so curved that it travels partially under the front end, $t$, of the guard-plate and close to the face of the cap D, Fig. 39, thus causing the end of the binder-arm to travel in close proximity to the cord-tying devices and draw the cord into the forward end of the slot U, the outwardly-curved front end, $t$, of the guard-plate T T' and the forward nose, $d$, of the cap D serving to guide and deflect the cord into the slot U, as well as into the slot U' of the cap, the projecting spur $d'$ aiding materially in deflecting the cord into the said slots, and causing the cord to pass under the knot bill or hook. As the binder-arm moves rearward along the face of the cap D the cord is drawn across the disk or wheel K and above or in front of the catches or hooks $o'$ formed by the ends of the plates O and L', as shown in Fig. 34. When the arm reaches the point to bring the main cord in the position just described the catch Y is released from the catch Y' and the head A commences its receding movement. As this movement begins the roller $F^3$ strikes against and rides up the face F', throwing the tucking-arm E E' forward and catching the cord in the notch $e$, where it is held and carried forward by the advance of the hook, such advance bringing the string in position to be caught by the knotting-bill, the nose $t'$ and nose $d$ assisting in guiding the string properly, so as to enter the slots U and U' in line with the knotting-bill. When the roller $F^3$ passes onto the face of the track or way F, over the end F', the hook, which has been thrown forward to the extent of its movement, will be held in that position while the roller passes the length of the track. At the same time that the hook E commences to advance by the receding movement of the head the bill G G' commences to rotate by the engagement of the rack $c$ with the pinion J'', and when the tucking-hook E has reached the limit of its forward movement the hook G G' will have made about one-eighth of a full revolution, catching both strands of the cord on its side, and at the same time the wheel or disk K will have been advanced a corresponding distance by the engagement of the pinion J with gear J', which movement of the wheel or disk takes the main cord from the binding-arm by the action of the hook $o'$. The movements of these parts—the tucking-hook, the knotting-bill, and the wheel or disk K—commence at the beginning of the receding movement of the head, and each being simultaneous with the other. As the head continues to recede the tying-bill continues its rotation, and the wheel or disk K continues to advance, allowing the cord to wind around the bill without pulling or drawing it from the bundle, the necessary slack being provided by this advance of the disk or wheel bringing the hooks $o'$ nearer the bill, thus decreasing the distance, and consequently the amount of cord, between the bill and the hooks $o'$ and cord-holding devices, such decrease in the length of the cord being taken up by the winding thereof around the bill. By this arrangement it will be seen that no unnecessary strain is placed upon the cord while the loop is being formed, as the cord required to form the loop is furnished from the portion between the bill and the disk or wheel K. When the bill has completed a half-revolution the roller H'' strikes the face $h'$ of the cam H' and commences to ascend such face, raising the stem $g$ and opening the jaw or bill G', and keeping it open while the hook continues to rotate, so that the string between it and the disk or wheel K, will enter the opening thus provided, the wheel or disk K having advanced correspondingly with the rotation of the bill, bringing the string into position to enter the opening, the string being held down by the action of the flange or ridge $d'$, which keeps it in contact with the edge or rim of the disk or wheel K, so that it will be sure to enter the opening between the jaws, the end of the jaw G passing into the recess or cavity $k$, and the bill or jaw G' passing above the rim $k'$ of the wheel or disk as the hook continues its rotation. Just before the bill or hook finishes a three-quarter revolution, and when the hooks $o'$ are nearly in line therewith, the projection P' strikes the face of the cam R' and turns the plate or holder M on its pivot $m'$, throwing the free end down and gradually opening the holder, allowing the end of the cord which has been caught thereby to be drawn out, and at the same time allowing the main cord, which was caught on the hooks $o'$, to pass into the slot $l$ $l'$, between the head L' and plate O and the rim of the disk or wheel, the inclined face of these hooks o' allowing the cord to pass readily into the slot as the wheel or disk advances. Just before the projection P' leaves the cam R' the hooks or jaws G G' will have passed clear of the wheel or disk, and the roller H'' will be disengaged from the incline h' and be engaged by or engaged with the cam I, drawing the stem g down, and with it the head or bill G', closing the jaws, with the string caught firmly between them. At the same time the projection P is in position to engage the face of the cam R and be raised, which engagement raises the free end of the holder M, catching the main cord between the edge of the holder and the edge of the head L', and at the same time severing it by the action of the cutting-edge n of the knife N, (which is raised with the holder,) and the cutting-edge o on the plate O at the end of the slot or opening u', the catching and the cutting occurring at the same time, or nearly so. At the completion of this cutting and holding operation the knotting-bill will have made one complete revolution, or nearly so, and both ends of the string will be free to be drawn through the loop which has been formed thereon. During all this time the roller $F^3$ is engaged with the track F; but as the parts reach the position just described the roller enters the depression F'', allowing the tucking-arm E E' to drop back out of the way for the stripping operation, which now begins. As the hook continues to revolve, the cord between its upper face and the bundle will be brought in contact with the end u' of the enlarged opening u. This engagement of the cord by the end u' will draw the loop which has been formed on the bill, over such bill to complete the knot, the ends or strands of the cord being held between the jaws G G'.

Fig. 37 shows the position of the hook, the cord, and their location with reference to the end u' at the commencement of the stripping or drawing-off operation, and Fig. 38 shows the relative position of these parts when the stripping is completed and the knot tied. At the completion of the tying of the knot the head will have receded to the extent of its movement, and the hook or bill will have made a half or nearly a half of another revolution, by which time the roller H'' has passed from the cam I, leaving the jaw sufficiently loose for the withdrawal of the ends of the string and the discharge of the bundle, which then takes place, and the disk or wheel K will have passed to the limit of its movement, the end of the main cord being caught and held by the holder, the cord passing from the point where caught over the rest or support L'', which prevents it from being drawn out of position, to the binding-arm, which also has completed its backward movement. The head and binding-arm then begin their return movement, the head, as it returns, giving a reverse movement to the several parts of the tying device from that just described; but during such reverse movement the holder will not be acted on by the cams R R' to open and close it, for the reason that during such movement the projection P' will engage the straight face of the cam R', carrying the cams around with the disk and reversing their position, so that on the next forward movement of the parts the cam R will engage the projection P', and the cam R' will engage the projection P, the cams being left at the completion of the reverse movement in the proper position to do their work, and being held in that position by the engagement of the stop or latch S with the straight face of the cam which is adjacent thereto. On the return movement of the head the operation first described will be repeated, and these movements will continue until the binding is completed, the forward movement of the head bringing the parts into position to do the work, and being required for that purpose only in the form shown.

By holding the end of the string in the manner shown and described it will be seen that the string passes from the point where caught through the opening $L^3$ over the face of the head L' in such manner that as the string is passed around the bundle by the action of the binding-arm it will draw against the side of the holder or head L' and against the plate or holder M, clamping the end of the string which is caught between the faces of the holder M and head $L^3$ in such manner that the tighter the string is drawn the firmer will be the clamp of these parts on the end which is caught.

As shown, the jaw or bill G is provided with an indentation or cut-away portion, forming a hook or catch, g'', on that side or face of the bill which is adjacent to the wheel or disk when the hook or bill is in position to commence a revolution, or has completed one revolution, the object of which hook or catch is to retain the ends of the string drawn through the loop until the loop is drawn tight, and the string cannot be released from the catch until the bill has nearly completed one and one-half revolution, at which time the ends of the cord are at right angles, or nearly so, with the side of the bill, and can be readily drawn away from the hook or catch g''.

I have herein described and shown a cap, D D', provided with a projection or spur, d', for the purpose of directing the cord under the knot bill or hook, to be wound on the latter. I do not here claim this feature, as it will form the subject-matter of a separate application for Letters Patent.

What I claim as new, and desire to secure by Letters Patent, is—

1. In a knot-tying mechanism for binding grain, a head or support consisting of a bottom or base with side supports or posts made from a single piece, and having an opening for the reception of the tying and cutting and holding devices, and enabling the parts thereof to be arranged in a small compact space without detriment to their operation, substantially as specified.

2. In a knot-tying mechanism for binding grain, a tucking-arm, E E', having its body E' pivoted to the head or support for the tying devices, and provided with an arm, f, to engage a stop, f', located on the side of the track or camway, for throwing the tucking arm or hook open, substantially as and for the purpose specified.

3. In a knot-tying mechanism for binding grain with a cord, cord-tucking arm or hook E E', having a side arm or extension, E'', carrying a roller, F³, in combination with a track or camway consisting of a straight or level portion, F, end or rising portion, F', and a depressed or hollowed-out portion, F'', over which the roller travels for opening and closing the cord arm or hook E E', substantially as and for the purpose specified.

4. In a knot-tying mechanism for binding grain, a tucking arm or hook, E E', having a side arm or extension, E'', carrying a roller, F³, in combination with a depressed or hollowed-out face or way, F'', for partially opening the arm or hook to allow the tying-bill to operate, substantially as and for the purpose specified.

5. In a knot-tying mechanism for binding grain, a wheel or disk, K, having one face thereof provided with a gear, J', and carrying on its opposite face a cord-holding device which operates by the rotation of the wheel or disk to catch and hold the end of the cord, substantially as specified.

6. In a knot-tying mechanism for binding grain, a wheel or disk, K, provided on one face with a gear, J', and carrying on its opposite face a cord holding and cutting device which operates by the rotation of the wheel or disk to sever and release the cord and catch and hold the end thereof, substantially as specified.

7. In a knot-tying mechanism for binding grain, a wheel or disk, K, having on one face a gear, J', inclosed by a rim or flange, k', for preventing the string from becoming entangled with the cogs of the wheel or disk, substantially as specified.

8. In a knot-tying mechanism for binding grain, a wheel or disk, K, having on one face a gear, J', and provided on this face with a flange or rim, k', and an opening, k, in combination with a pinion, J, and a tying-bill, substantially as and for the purpose specified.

9. In a knot-tying mechanism for binding grain, a wheel or disk, K, having a gear, J', on one side thereof, and carrying the cord-holding device on the opposite side, in combination with a tying-bill, and mechanism for driving the wheel or disk from the bill, substantially as specified.

10. In a knot-tying mechanism for binding grain, a swinging head or support, A A' A'', supporting and carrying the tying, cutting, and holding devices, consisting of a tying-bill and a wheel or disk, K, having a gear, J', on one face thereof, and carrying the cord holding and cutting devices on the opposite face, in combination with a pinion, J, located on the stem of the tying-bill and engaging the gear J', and a pinion, J'', also located on the stem of the bill and engaging the rack, and a rack supporting the head or support A A' A'' and operating to drive the pinion J'', substantially as specified.

11. In a knot-tying mechanism for binding grain, the cord-holding device, consisting of a stationary jaw overhanging the periphery of the wheel to which it is secured, so as to leave a space between the two, and a jaw pivoted upon the said wheel, the pivoted jaw opening and closing by turning on its pivot during the rotation of the wheel to release and catch the cord, substantially as specified.

12. In a knot-tying mechanism for binding grain, a stationary plate or jaw, L L', and a pivoted plate or jaw, M, both located on a revolving wheel or disk, the stationary jaw having its head L' overhanging the periphery of the wheel to form the cord-slot, in combination with an engaging cam or face, around which the pivoted jaw is carried for opening and closing the jaws by the oscillatory movement of the plate or jaw M on its pivot, substantially as and for the purpose specified.

13. In a knot-tying mechanism for binding grain, a stationary plate or jaw, L L', and a movable plate or jaw, M, provided with projections or lugs P P', both jaws being located on a revolving wheel or disk, in combination with cams or cam-faces arranged to engage the projections or lugs P P' and raise and depress the free end of the plate or jaw M to open and close the holder, substantially as and for the purpose specified.

14. In a knot-tying mechanism for binding grain, the wheel or disk K, stationary plate or jaw L L', and movable plate or jaw M, provided with projections or lugs P P', in combination with a collar or ring mounted on the hub of the wheel or disk K, and provided with cams or cam-faces R R', against which the projections or lugs P P' will bear and open and close the jaws, substantially as and for the purpose specified.

15. In a knot-tying mechanism for binding grain, the cams R R', each having a curved face and a straight end or face, in combination with a wheel or disk, and a movable or pivoted plate or jaw, M, located on the wheel or disk, and provided with a projection or lug, P', for engaging the straight end or face of each cam alternately and carrying the cams around with the disk or wheel, substantially as and for the purpose specified.

16. In a knot-tying mechanism for binding grain, a wheel or disk, K, cord-holding devices located on the wheel or disk, and a cam or cam-face for operating the movable plate or jaw of the cord-holder, in combination with a pivoted or swinging stop or lock, S, for engaging the cam and preventing rotation thereof when acting to operate the movable jaw, and for allowing the cam to turn with the wheel or disk when non-acting, substantially as specified.

17. In a knot-tying mechanism for binding grain, a wheel or disk, K, and pivoted plate or jaw, and a cutter or blade carried by the said plate or jaw, in combination with a stationary cutter or blade, O, having a cutting-edge, o, and an overhanging stationary jaw, L L', all carried by the wheel or disk K for severing the cord and catching and holding the end thereof when severed by the oscillation of the plate or jaw M on its pivot, substantially as specified.

18. In a knot-tying mechanism for binding grain, having a revolving wheel or disk carrying a cord-holding device, a catch or hook, o', located on the wheel or disk, and projecting beyond the periphery thereof, for taking the cord and guiding it to the holding devices, substantially as and for the purposes specified.

19. In a knot-tying mechanism for binding grain, having a revolving wheel or disk carrying a cord-holding device, and a breast or rest, L'', projecting out from the face of the wheel or disk and forming a support for the cord, substantially as and for the purpose specified.

20. In a knot-tying mechanism for binding grain, a cam, H', having the two inclines h h', in combination with a roller, H'', stem g, sliding jaw or head G', jaw or head G, and stem G'', for opening the jaws to receive the binding-cord, substantially as and for the purpose specified.

21. In a knot-tying mechanism for binding grain, a cam, I, located on the end of an arm, I', having a yielding support, I'', in combination with a roller, H', stem g, sliding jaw G', stationary jaw G, and stem G'', for closing the jaws and holding them closed, substantially as specified.

22. In a knot-tying mechanism for binding grain, a cam, I, in combination with a roller, H'', stem g, sliding jaw G', stationary jaw G, and stem G'', for closing the jaws and holding the cord while the loop is being drawn from the jaws, and allowing the jaws to open at the completion of the stripping and release the cord, substantially as specified.

23. In a knot-tying mechanism for binding grain, the cap or cover D D', located over the tying mechanism, and having a slot, U', for the passage of the cord, and provided with an internal flange or rib, d'', for holding the cord down and insuring its being caught by the loop-forming devices, substantially as specified.

24. In combination with a knot-tying mechanism for binding grain, a stationary guard-plate or covering having a slot or opening, U, for the passage of the binding-cord, and a point or hook, t, to take the cord and guide it into the slot U, substantially as and for the purpose described.

25. The combination, with a knot-tying mechanism for binding grain, of a stop, w', formed by the terminal end of the slot u in the guard-plate or covering, and arranged back of the terminal sweep of the tyer, to cause the further advance of the tyer to slip the loop by the cord coming in contact with the said stationary stop, substantially as described.

MAURICE E. BLOOD.

Witnesses:
SAMUEL W. WINDERS,
SYLVANUS HOLCOMB.